United States Patent [19]

Thurmond, Jr.

[11] 4,185,853
[45] Jan. 29, 1980

[54] FOLDING NOSEPLATE FOR A HANDTRUCK

[75] Inventor: Elmer T. Thurmond, Jr., Miami, Fla.

[73] Assignee: Equipment Company of America, Hialeah, Fla.

[21] Appl. No.: 868,318

[22] Filed: Jan. 10, 1978

[51] Int. Cl.² .............................................. B62B 1/20
[52] U.S. Cl. ................................. 280/652; 280/47.28; 280/47.29
[58] Field of Search ............... 280/47.29, 47.28, 47.27, 280/652, 5.24, 654

[56] References Cited

U.S. PATENT DOCUMENTS

| | | | |
|---|---|---|---|
| 529,738 | 11/1894 | Lepage | 280/47.28 |
| 957,840 | 5/1910 | Bjorklund | 280/47.27 X |
| 2,922,658 | 1/1960 | Manahan | 280/47.29 |
| 3,046,035 | 7/1962 | Nichols | 280/47.27 |
| 3,104,889 | 9/1963 | Branch, Jr. | 280/47.29 X |

Primary Examiner—Joseph F. Peters, Jr.
Assistant Examiner—Milton L. Smith
Attorney, Agent, or Firm—Jack E. Dominik

[57] ABSTRACT

A handtruck comprises a back frame having an upper handle portion and an elongated main body portion, with a pair of wheels mounted to the lower portion of the frame. A folding noseplate is pivotally attached to the lower extremity of the frame, along with a folding noseplate extension. The noseplate has a ledge portion rearward of the pivotal mounting point which is disposed in intersurface engagement with a surface on the wheel mount to secure the noseplate in article supporting, extending outward relationship to the back frame.

7 Claims, 7 Drawing Figures

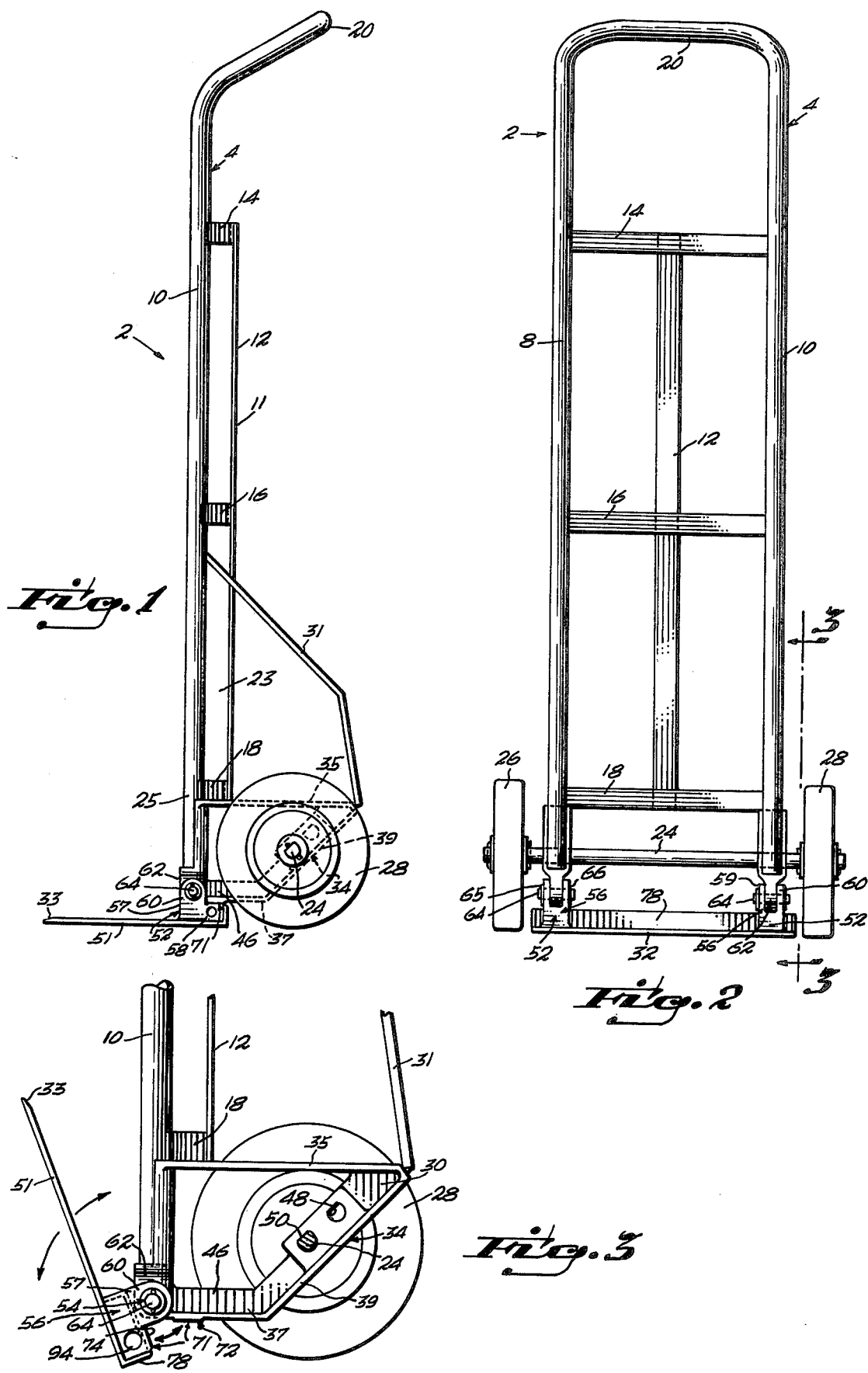

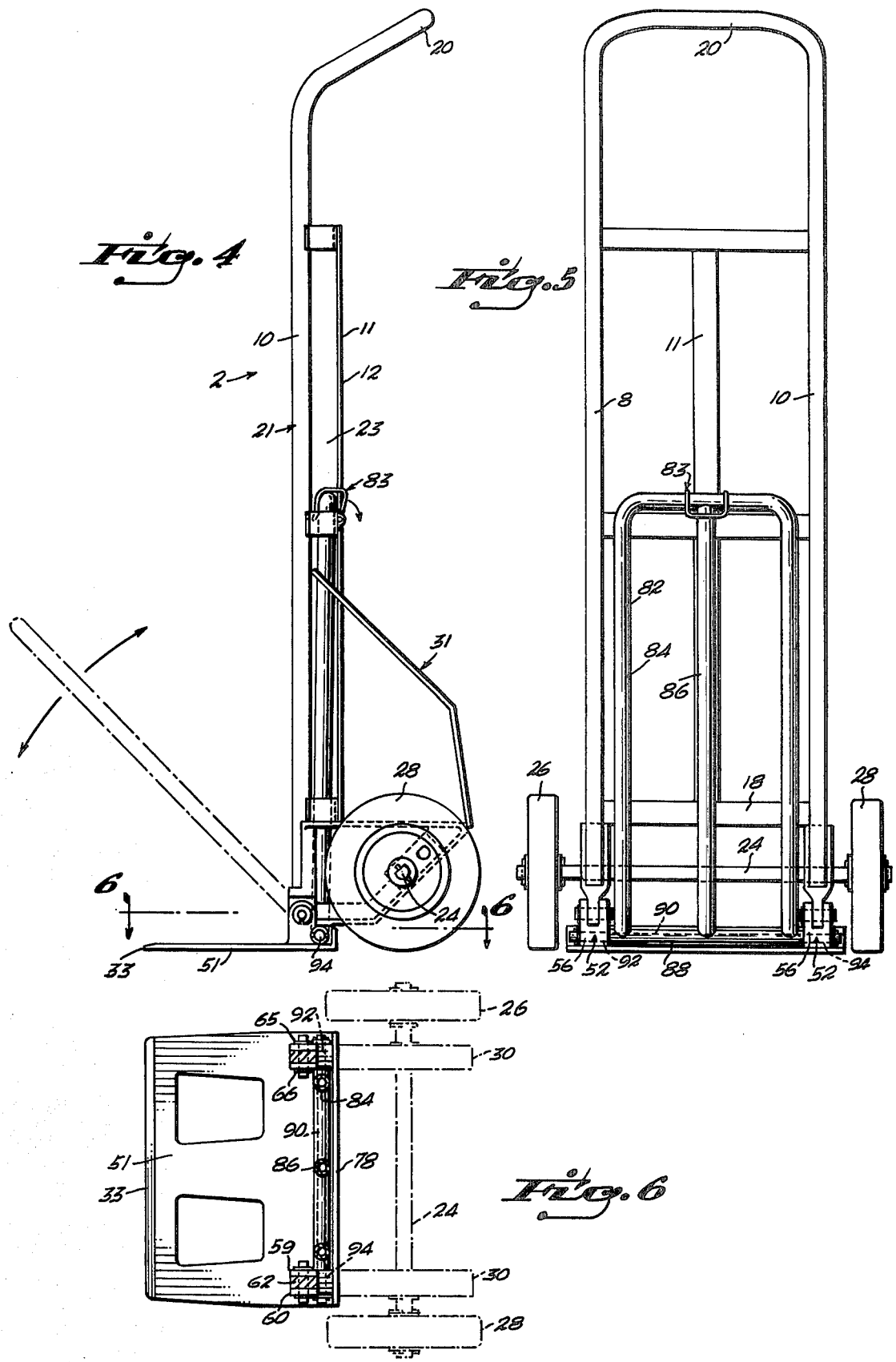

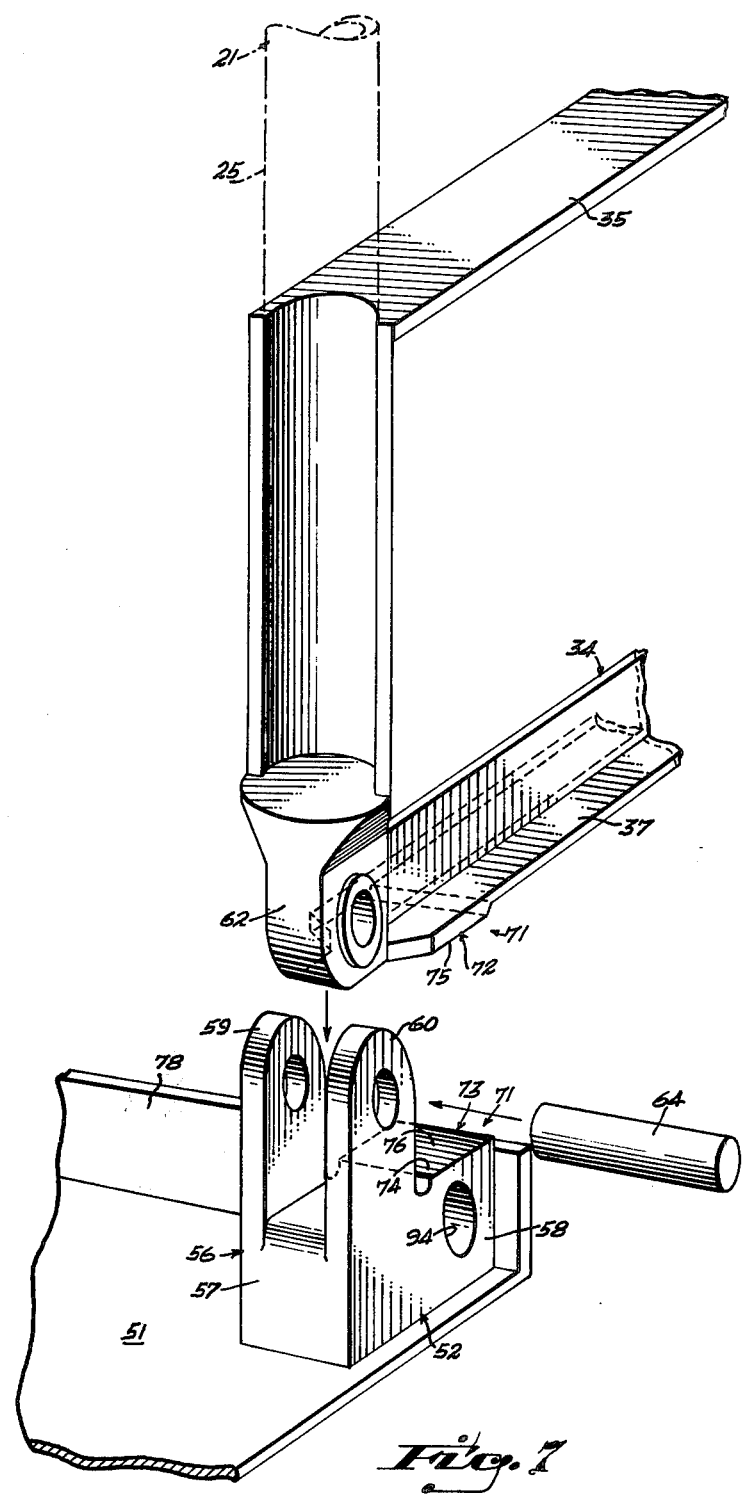

FOLDING NOSEPLATE FOR A HANDTRUCK

FIELD OF THE INVENTION

The present invention relates to handtrucks, and more specifically to handtrucks utilizing noseplates.

DESCRIPTION OF THE PRIOR ART

Various types of handtrucks exist in the prior art which use noseplates for sliding under, lifting up, and securing items so that the same may be movably positioned. Normally these noseplates are positioned at a right angle relative to the main body portion of the handtruck. The extending noseplate creates significant storage problems, both in the shipment of the same to the customers and when being stored by the customer. More specifically, with the noseplate extending outward in one direction relative to the back frame of the handtruck, and the wheel mounts extending outward in the opposite direction, the prior art handtrucks require a substantial amount of area for shipment or storage.

In tracing the development of handtrucks utilizing noseplates, it was found that the noseplates were previously welded or riveted to the tubular members of the back of the handtruck. This means of connecting the noseplate had the inherent problem of providing inadequate noseplate-to-frame connection, in that a downward force on the noseplate frequently broke the connection. Applicant, in its prior art designs, was able to overcome this problem by a strong, box-type noseplate-to-frame connection having basically a trussed construction. This box joint connection was created by offsetting the point of connection of the tubular members to the adjacent edge of the noseplate. A flange integrally formed in the noseplate then extended upward from the noseplate and was welded to the outward extending loop brackets. This created a sturdy, box-type joint which provided a compression relationship between the loop bracket and the flange of the noseplate, which in turn favorably changed the bending and tension relationship in the weld of the tubular members to the noseplate.

Additionally, the present state of the art recognizes the utilization of a folding noseplate extension which is pivotally connected at the lower portions of the handtruck, and when folded downward, extends outwardly over the outer extremity of the noseplate. This forms an extended noseplate.

The inherent problem of the noseplate creating storage problems has been overcome by the applicant's invention, as described hereinafter. However, applicant's structure, which involves rotation of the noseplate to overcome this problem, creates several other problems. First, the box-like junction between the noseplate and the frame involving a rigid trussed construction must be maintained. The problem that arises is that some new structure having the equivalent compression - tension relationship must be incorporated into the new design. Additionally, the folding noseplate extension normally is pivotally mounted in the center of the above-described box-type noseplate to frame connection. Therefore, the new design must also incorporate means for rotatably mounting the folding noseplate extension.

Accordingly, it can readily be seen that there is a need in the equipment industry for a noseplate construction which minimizes storage problems, while maintaining the tensioncompression relationship of the noseplate to frame connection, while also allowing for the pivotal mounting of a folding noseplate extension. Moreover, this design should be simple, inexpensive to manufacture and maintain, yet sufficiently durable for continued use under adverse conditions.

SUMMARY OF THE INVENTION

The present invention is directed toward a handtruck comprising a back frame having an upper handle portion and an elongated main body portion. A pair of opposed mounting means are used to secure a pair of opposed wheels in axially rotatable relationship to the lower portion of the back frame. The improvement of the handtruck comprises a folding noseplate pivotally attached to the lower extremity of the back frame. A pair of opposed connector means pivotally interconnect one edge of the noseplate to the back frame. This allows the noseplate to have a folded position when in a folded inward position, with the noseplate being disposed in a plane substantially parallel with the elongated main body portion. Alternatively, the noseplate has an operable position of extending outward in substantially perpendicular relationship to the elongated main body portion. The noseplate is rotated downward about its pivotal axis until it reaches the operable position, at which point a pair of stop means are disposed to prevent any further rotation of the noseplate about its pivotal axis. The stop means includes a first and second flat stop member disposed in opposed engagement when the noseplate is in its operable position. More specifically, each mounting means has a first flat surface portion disposed thereon so as to define the first flat stop member facing downward. The pair of connector means used to pivotally connect the noseplate to the back frame are offset relative to an adjacent edge of the noseplate, thereby providing therebetween a ledge portion. On each ledge portion there is defined a second flat surface portion which is aligned and coordinated to interface with one of the first flat surface portions and thereby stop further rotation of the noseplate. The pair of second flat surface portions forms the second flat stop member.

Each of the connector means is formed from an enlarged base member secured to the noseplate, with the enlarged base member having a forward and rearward portion. The rearward portions comprise the previously mentioned ledges which in turn define the second flat surface portions. Also, the folding noseplate extension is pivotally mounted by an axle centrally traversing the two rearward portions.

A primary object of the present invention is to provide a handtruck having a foldable noseplate whereby the same may be folded when stored, and pivotally positionable in object lifting disposition when in use.

A more detailed object of the present invention is to provide a handtruck having a foldable noseplate so that upon folding, adjacently stored handtrucks would have better nesting relationships relative to each other and therefore minimize the required storage and shipment area for the same.

A related object of the present invention is to provide a handtruck having a pivotally mounted, foldable noseplate which maintains a compression tension connection between the noseplate and the back frame of the handtruck.

A related and more specific object of the present invention is to provide a handtruck having a pivotally mounted, foldable noseplate which has stop means so that part of the downward force of a loaded item is transferred to tension on the back frame, while another portion of the downward force is transferred to compression on the wheel mounting means.

Another related object of the present invention is to provide a handtruck having a pivotally mounted, foldable noseplate which can incorporate a folding nose plate extension which is pivotally mounted to the noseplate.

Yet another related and more specific object of the present invention is to provide a handtruck having a pivotally mounted, foldable noseplate which incorporates the use of a folding noseplate extension capable of being stored in a recess of the back frame.

DESCRIPTION OF DRAWINGS

Further objects and advantages of the present invention will become apparent as the following description proceeds, taken in conjunction with the accompanying drawings in which:

FIG. 1 is a side view of the handtruck of the present invention.

FIG. 2 is a front view of the handtruck of FIG. 1.

FIG. 3 is a fragmentary view of the lower portion of the handtruck of FIG. 1 with the wheel removed taken along sectional line 3—3 of FIG. 2.

FIG. 4 is a side view of the handtruck of FIG. 1 with a noseplate extension incorporated therewith.

FIG. 5 is a front view of the handtruck of FIG. 4.

FIG. 6 is a top view of the noseplate of the handtruck.

FIG. 7 is an exploded, fragmentary perspective view of the pivotal connection of the noseplate.

DETAILED DESCRIPTION OF THE PREFERRED EMBODIMENT

Referring to FIGS. 1 and 2 there is disclosed a handtruck, generally indicated as 2, having a conventional back frame 4 formed preferably, but not necessarily of tubing 6, ideally made of aluminum or steel. The tubing 6 has two right angle bends so as to define an elongated main body portion 21 having two longitudinal side members 8 and 10 and a handle portion 20 interconnecting the same. The back frame 4 normally includes a lattice-like back brace 11 of conventional design which interconnects the two longitudinal side members 8 and 10 to contain small items placed upon the handtruck 2. Furthermore, as will be described further on, the back brace 11 provides a recess area 23 in which the folding noseplate extension 82 may be stored when not in use. The back brace 11 ideally includes several spaced-apart, substantially parallel traverse strut members which are interposed between the longitudinal side members 8 and 10. A strap back member 12 interconnects the three tranverse strut members 14, 16 and 18 in a longitudinal fashion. The handle portion 20 is formed in an angled plane relative to the main body portion 21. Generally, the construction of the back frame 4 is well known in the industry, and the back brace and the handle can take numerous forms. The primary significance of the back brace to the present invention is that it defines a recess 23 in which the folding noseplate extension 82 is stored, as will become clearer upon further explanation. Adjacent the lower region 25 of the main body portion 21 is mounted a pair of opposed wheels 26 and 28. The mounting of the same is accomplished by a pair of wheel mounts 30 as can be seen in FIG. 6. Extending upward from the wheel mounts 30 is a pair of optional stair climbers 31 which are of conventional design and per se form no part of the present invention.

One of the wheel mounts 30 can be seen in detail in FIG. 3, with the other wheel mount 30 having the same structural features but mounted on the opposite side of the back frame 4. Each wheel mount 30 comprises a loop bracket 34 which is secured to one of the longitudinal side members 8 and 10, preferably by means of welding. Ideally, loop bracket 34 has two substantially parallel upper and lower members 35 and 37 respectively joined by angled member 39. These members 35, 37 and 39 complete a loop so that the opposed ends of the loop bracket 34 can be secured to one of the longitudinal side members 8 or 10. Additionally, as shown in FIG. 1, each stair climber 31 normally extends upward from the joinder of members 35 and 39 to attach to one of the longitudinal side members 8 or 10. Although both wheel mounts 30 are not shown in detail in the drawings, wheel mount 30 shown in FIG. 3 is illustrative of both wheel mounts 30. The specific construction of wheel mounts 30 is well known in the art, and alternative embodiments of the same can be easily adapted to the present invention.

Each loop bracket 34 further includes a conventional mounting extension 46 normally disposed upright into the interior relative to the loop bracket 34 adjacent the members 37 and 39. Situated on the mounting extension 46 are typically two axle receiving apertures 48 and 50. These provide for adjustable alternative mounting points for the opposed wheels 26 and 28, the choice depending on diameter of wheel used.

As particularly shown in FIG. 3, the noseplate 51 is pivotally mounted to the lower extremity of the back frame 4. A pair of connector means 56 provide the pivotal relationship between the longitudinal side members 8 and 10 and the noseplate 51. As more specifically shown in FIG. 7, a pair of enlarged base members 52 are mounted on the noseplate 51 in spaced apart relationship along one end of the noseplate 51. Each enlarged base member 52 includes a forward portion 57 and a rearward portion 58. Each connector means 56 is defined to include the forward portion 57 of one of the enlarged base members 52 along with a prong 62, described hereinafter. Each forward portion 57 has a pair of co-extending, spaced-apart, upright arms 59 and 60 which are disposed to receive a cooperatively aligned dependent prong 62 mounted on the lower extremity of one of the longitudinal side members 8 or 10. A short rod 64 traverses the pair of arms 59 and 60 and the prong 62 so as to pivotally mount the same relative to each other. Additionally a pair of fasteners 65 and 66 are included in the preferred embodiment to facilitate the pivotal connection, with one of each of the pair disposed on the outer sides of each of the arms 59 and 60.

With the pivotal attachment of the noseplate 51, as previously described, stop means 71 must be provided in order to stop the rotatable noseplate 51 in a position substantially at right angles to the main body portion 21. As partially illustrated in FIG. 7, stop means 71 includes a first flat stop member 72 and a second flat stop member 73. The first stop member 72, in the preferred embodiment, comprises a pair of first flat surface portions 75, one formed on the outer surface of each of the loop brackets 34. As previously mentioned, the description of one of the loop brackets 34 is representative of the description of the other loop bracket 34. The rearward portion 58 of the enlarged base member 56 provides for a ledge 74 positioned behind the pivotal connection of the connector means 54. Defined on the upper surface of each of the pair of ledges 74 is a second flat surface portion 76. The pair of second flat surface portions 76 on the pair of ledges comprises the second stop member 73. The correspondingly aligned first and second flat surface portions 75 and 76 are positioned to engage each other in intersurface contact when the noseplate 51 is substantially perpendicular to the main body portion 21. Although in the preferred embodiment, the flat stop members 72 and 73 are shown as being made up of two separate spaced-apart elements, each stop member could have been designed to be a single element extending along most of the end of the noseplate.

Ideally, the noseplate 51 is formed of a stiff, damage resistant, hi-tensile steel, and can come in a variety of widths. In the preferred embodiment, a noseplate 51 is shown which has a width less than the distance between opposed wheels 26 and 28. However, substantially wider noseplates 51 may be utilized with the present invention. It is preferable to have a beveled outer edge 33 which assists in slipping under the articles to be moved. The rearward end of the noseplate 51 ideally includes a flange 78 running along the entire rearward edge. This upright flange 78 provides for a stiffening of the plate so as to be structurally stronger. In the preferred embodiment, the flange 78 is preferably attached to both enlarged base members 52 and extends therebetween.

As an added feature to the handtruck 2 of the preferred embodiment, a folding noseplate extension 82 is included therewith, as shown in FIGS. 4, 5, and 6. The folding noseplate extension 82 typically comprises an outer tube member 84 having two bends therein so as to define a U-shaped configuration. Also, the folding noseplate extension 82 includes a center tube member 86 longitudinally disposed and interposed between the two bends of the outer tube member 84 and a end tube member 88. An axle 90 is positioned through the end tube meber 88 to pivotally mount the folding nose plate extension. A pair of concentric bores 92 and 94 are used to mount the axle 90, with one of the bores formed in each of the rearward portions of the enlarged base member 56. As previously described, the back brace 11 forms a recess 23 between the longitudinal side members 8 and 10. With the folding noseplate extension 82 pivotally mounted to the noseplate 51, the same can be folded inward into the recess 23 when not used, and maintained in such a disposition preferably by latch 83. Likewise, when the folding noseplate extension 82 is in use, it can be pivoted downward and supported in substantially parallel relationship by the noselate 51. Additionally, it should be noted that the pivotal connection of the folding noseplate extension 82 with the rearward portion of the enlarged base member 56 is off set rearwardly relative to the longitudinal side members 8 and 10. In this manner, a recess 80 is thereby defined near the base of the back frame 4 so that the face of the frame will permit small drums to be cradled securely between the longitudinal side members 8 and 10.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A handtruck including a back frame having an upper handle portion and an elongated main body portion, a pair of opposed wheels, a pair of opposed, rearwardly extending mounting means for securing said pair of wheels in axially rotatable relationship to the lower portion of said back frame, wherein the improvement comprises, a folding noseplate pivotally attached to the lower extremity of said back frame, said noseplate having a folded position when in a folded inward disposition in a plane substantially parallel to said elongated main body portion, said noseplate having an operable position when in an outward extending disposition in a plane substantially perpendicular to said elongated main body portion, said lower extremity of said back frame comprising a pair of opposing, spaced-apart depending prongs, a minor portion of said noseplate extending rearwardly of said back frame, in the operable position of the noseplate, a pair of enlarged base members secured to said noseplate at its opposing rearward corners, each said enlarged base member having a forward and rearward portion, each of said forward portions comprising an opposed pair of connector means for pivotal attachment of said noseplate to said depending prongs, each of said connector means including a pair of spaced-apart, substantially parallel upright arms for receiving said depending prongs, each of said connector means further including pin means traversing said pair of upright arms and said cooperatively positioned prongs, each said rearward portion disposed rearwardly of said back frame, each said rearward portion having an upwardly facing flat surface, each of said mounting means comprising a loop bracket with opposed bracket end portions secured to said back frame, the lower said end bracket portion disposed in substantially perpendicular relationship to said back frame, said lower end bracket portion having a flat surface portion integrally formed on the downwardly facing surface of the same, whereby pivoting of said noseplate at the point of juncture of the depending prongs and the connector means brings the downwardly facing flat portion formed on the opposed mounting means and the upwardly facing flat portion formed on the rearward portion of the enlarged base member into rotation-stopping alignment.

2. In the handtruck of claim 1,
a stiffening flange integrally formed on the edge of said noseplate adjacent to and extending between both said enlarged base members.

3. In the handtruck of claim 2,
said rearward portion of each of said enlarged base members having concentric bores provided therein, said concentric bores adapted to receive opposing ends of an elongate axle member, a folding noseplate extension member pivotably mounted on said elongated axle member, whereby said enlarged base members serve the triple function of connecting the folding noseplate to said back frame and of providing rotation stopping means for said folding noseplate, and of providing independent connection means for said noseplate extension member, whereby said independent connection means allows the folding nose plate to be in its operable position when said nose plate extension member is in its inwardly folded position, whereby said independent connection means further allows said extension member to be supported by said folding nose plate when both said members are in the operable position.

4. In the handtruck of claim 3, said extension member having an outer tube member having two bends therein to define a U-shaped configuration, said extension member further having a hollow end member attached to and traversing the free ends of said outer tube member, said hollow end member adapted to receive therein said elongated axle member, whereby said extension member is pivotably attached by said axle member to the lower extremity of said back frame.

5. In the handtruck of claim 4, said back frame having a back brace attached rearwardly thereof in substantially parallel spaced-apart relationship therewith, said disposition of said back frame and back brace defining a recess area therebetween, said recess area adapted to receive said nose plate extension member when said extension member is in its folded inwardly position, said recess further adapted to receive therein a minor portion of a load carried by said folding nose plate and nose plate extension member to provide nesting reception of said load within said recess area, whereby said recess serves the dual function of providing a storage area for the extension member when in its folded inwardly position and a nesting area for loads when said extension member is deployed into its operable position.

6. In the handtruck of claim 5, said back brace having a center tube member longitudinally disposed and interposed between the two bends of the outer tube member, whereby loads nested within said recessed area are further cradled by said center tube member.

7. In the handtruck of claim 6, comprising latch means retaining said extension member in its folded inwardly position for holding said extension member into load non-interfering relationship when a load is being transported in the handtruck with the folding noseplate in its operable position.

* * * * *